(12) United States Patent
Takeuchi

(10) Patent No.: US 9,396,371 B2
(45) Date of Patent: Jul. 19, 2016

(54) NON-CONTACT TYPE INFORMATION PROCESSING DEVICE

(71) Applicant: NIDEC SANKYO CORPORATION, Nagano (JP)

(72) Inventor: Junro Takeuchi, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 14/403,000

(22) PCT Filed: Dec. 25, 2013

(86) PCT No.: PCT/JP2013/084660
§ 371 (c)(1),
(2) Date: Nov. 21, 2014

(87) PCT Pub. No.: WO2014/132540
PCT Pub. Date: Sep. 4, 2014

(65) Prior Publication Data
US 2015/0356333 A1  Dec. 10, 2015

(30) Foreign Application Priority Data
Feb. 28, 2013  (JP) .................................. 2013-038181

(51) Int. Cl.
*G06K 7/00* (2006.01)
*G06K 7/10* (2006.01)
(Continued)

(52) U.S. Cl.
CPC .......... *G06K 7/10336* (2013.01); *G06K 19/077* (2013.01); *G06K 19/0723* (2013.01);
(Continued)

(58) Field of Classification Search
CPC ............ G06K 19/0723; G06K 19/077; G06K 19/07783; H01Q 7/00; H05K 1/0219
USPC .......................................................... 235/439
See application file for complete search history.

(56) References Cited

U.S. PATENT DOCUMENTS 5,963,177 A * 10/1999 Tuttle ............... G06K 19/07786
340/10.1
7,404,199 B2 * 7/2008 Arneson ............. G06K 7/0095
720/718

(Continued)

FOREIGN PATENT DOCUMENTS

| JP | 200369339 A | 3/2003 |
| JP | 2005236585 A | 9/2005 |
| JP | 2005236586 A | 9/2005 |

OTHER PUBLICATIONS

International Search Report for International Application No. PCT/JP2013/084660, mailed Feb. 10, 2014, with English translation.

*Primary Examiner* — Thien M Le
*Assistant Examiner* — Claude J Brown
(74) *Attorney, Agent, or Firm* — Cantor Colburn LLP

(57) ABSTRACT

A non-contact type information processing device may include a flat plate-shaped substrate on which a communication antenna formed in a ring shape and a signal processing circuit part electrically connected with the communication antenna are mounted; and a connector member structured to electrically connect a host device on which the non-contact type information processing device is mounted with the non-contact type information processing device. The signal processing circuit part may be mounted on the substrate on an outer peripheral side relative to the communication antenna formed in the ring shape; and the connector member may be mounted on the substrate on an inner peripheral side relative to the communication antenna formed in the ring shape so that an inserting direction of a second connector member which is inserted and connected with the connector member is substantially parallel to a thickness direction of the substrate.

8 Claims, 3 Drawing Sheets

(51) Int. Cl.
    *G06K 19/077*    (2006.01)
    *G06K 19/07*     (2006.01)
    *H01Q 7/00*      (2006.01)
    *H01Q 1/22*      (2006.01)
    *H01Q 23/00*     (2006.01)

(52) U.S. Cl.
    CPC .... *G06K19/07747* (2013.01); *G06K 19/07783*
    (2013.01); *H01Q 1/2208* (2013.01); *H01Q 7/00*
    (2013.01); *H01Q 23/00* (2013.01)

(56) References Cited

U.S. PATENT DOCUMENTS

| | | | | |
|---|---|---|---|---|
| 2003/0229793 A1* | 12/2003 | McCall | .................. | G06Q 20/00 713/186 |
| 2007/0013062 A1* | 1/2007 | Kobayashi | .......... | H01L 23/3114 257/734 |
| 2007/0164119 A1* | 7/2007 | Liu | .................. | G06K 19/07749 235/492 |
| 2009/0040734 A1* | 2/2009 | Ochi | .................. | G06K 19/0723 361/737 |
| 2010/0197349 A1* | 8/2010 | Morita | ............... | G06K 7/10237 455/558 |
| 2012/0055999 A1* | 3/2012 | Le Garrec | ............ | G06K 19/077 235/492 |
| 2013/0008969 A1* | 1/2013 | Sakai | ................. | G06K 19/0727 235/492 |
| 2013/0176187 A1* | 7/2013 | Matsunaga | ............... | H01Q 7/00 343/793 |
| 2014/0008446 A1* | 1/2014 | Carr | ....................... | H01Q 1/248 235/492 |
| 2014/0177180 A1* | 6/2014 | Malek | .................... | H05K 7/142 361/749 |

* cited by examiner

NON-CONTACT TYPE INFORMATION PROCESSING DEVICE

CROSS REFERENCE TO RELATED APPLICATIONS

This is the U.S. national stage of International Application No. PCT/JP2013/084660, filed on Dec. 25, 2013. Priority under 35 U.S.C. §119(a) and 35 U.S.C. §365(b) is claimed from Japanese Application No. 2013-038181, filed Feb. 28, 2013.

FIELD OF THE INVENTION

The present invention relates to a non-contact type information processing device configured to perform communication of information with a card-shaped medium in a non-contact manner.

BACKGROUND

Conventionally, an information terminal has been known which is provided with an antenna module configured to perform communication of information with an outer reader/writer by utilizing an RFID (Radio Frequency Identification) function (see, for example, Patent Literature 1). The antenna module described in Patent Literature 1 includes an antenna coil and a signal processing circuit part. The antenna coil is formed in a substantially square ring shape and is mounted on a substrate which is formed in a substantially square shape. The signal processing circuit part is mounted on the substrate on an inner peripheral side relative to the antenna coil which is formed in a ring shape.

In the antenna module described in Patent Literature 1, a connection piece is formed in the substrate for electrically connecting an electric circuit of the information terminal with the signal processing circuit part. The connection piece is formed in a strip shape protruding to an outer peripheral side of the substrate formed in a substantially square shape. A tip end of the connection piece is formed with a terminal part which is to be connected with the electric circuit of the information terminal. Further, a shield member for covering the signal processing circuit part is attached to the substrate. The shield member functions, for example, to reduce an effect of a magnetic field generated by the antenna coil on the signal processing circuit part and thereby an erroneous operation of the signal processing circuit part is prevented.

PATENT LITERATURE

[PTL 1] Japanese Patent Laid-Open No. 2005-236585

In the antenna module described in Patent Literature 1, the connection piece in a strip shape protruding to the outer peripheral side of the substrate is formed in the substrate. In this case, since the signal processing circuit part is mounted on the substrate on an inner peripheral side relative to the antenna coil, the size of the antenna module can be relatively reduced. However, in the antenna module described in Patent Literature 1, the signal processing circuit part mounted on the substrate on the inner peripheral side relative to the antenna coil is covered by the shield member and the shield member is disposed on the inner peripheral side relative to the antenna coil. Therefore, in the antenna module, a magnetic field generated by the antenna coil may be weakened largely by a loss due to an eddy current generated in the shield member when the antenna coil is excited.

In view of the problem described above, at least an embodiment of the present invention provides a non-contact type information processing device whose size is capable of being relatively reduced and which is capable of suppressing lowering of the strength of a magnetic field generated by the communication antenna.

SUMMARY

To achieve the above, at least an embodiment of the present invention provides a non-contact type information processing device which performs communication of information with a card-shaped medium in a non-contact manner including a flat plate-shaped substrate on which a communication antenna formed in a ring shape and a signal processing circuit part electrically connected with the communication antenna are mounted, and a connector member for electrically connecting a host device on which the non-contact type information processing device is mounted with the non-contact type information processing device. The signal processing circuit part is mounted on the substrate on an outer peripheral side relative to the communication antenna formed in the ring shape, and the connector member is mounted on the substrate on an inner peripheral side relative to the communication antenna formed in the ring shape so that an inserting direction of a second connector member which is inserted and connected with the connector member is substantially parallel to a thickness direction of the substrate.

In the non-contact type information processing device in accordance with at least an embodiment of the present invention, although the signal processing circuit part is mounted on the substrate on an outer peripheral side relative to the communication antenna formed in a ring shape, the connector member is mounted on the substrate on an inner peripheral side relative to the communication antenna formed in the ring shape. Therefore, in at least an embodiment of the present invention, a region for mounting the connector member is not required to provide on an outer peripheral side relative to the communication antenna of the substrate. For example, a connection piece is not required to protrude to an outer peripheral side from the substrate like the antenna module described in Patent Literature 1. Therefore, according to at least an embodiment of the present invention, the size of the substrate can be relatively reduced and, as a result, the size of the non-contact type information processing device can be relatively reduced.

Further, in the non-contact type information processing device in accordance with at least an embodiment of the present invention, the signal processing circuit part is mounted on the substrate on an outer peripheral side relative to the communication antenna. Therefore, a shield member is not required to dispose on an inner peripheral side relative to the communication antenna and, alternatively, the size of a shield member disposed on an inner peripheral side relative to the communication antenna can be made small. Accordingly, in at least an embodiment of the present invention, strength of a magnetic field generated by the communication antenna can be suppressed from being reduced by a shield member. Further, in the antenna module described in Patent Literature 1, a large characteristic variation caused by the shield member may be easily occurred in the antenna module and thus adjustment of the antenna module is required beforehand by taking into consideration of the characteristic variation. However, in the non-contact type information processing device in accordance with at least an embodiment of the present invention, a characteristic variation amount of the non-contact type information processing device caused by a shield member can be reduced and, as a result, a load such as characteristic variation adjustment of the non-contact type information processing device can be reduced.

In addition, in the non-contact type information processing device in accordance with at least an embodiment of the present invention, the connector member is mounted on the substrate so that an inserting direction of a second connector member which is inserted and connected with the connector member is substantially parallel to a thickness direction of the substrate and thus, wiring lines drawn out from the second connector member can be prevented from being disposed so as to pass across the communication antenna. Therefore, according to at least an embodiment of the present invention, an effect of the wiring lines drawn out from the second connector member on a magnetic field generated by the communication antenna can be reduced. Further, an effect of the magnetic field generated by the communication antenna on the wiring lines drawn out from the second connector member can be reduced.

In at least an embodiment of the present invention, it is preferable that the substrate is mounted with a connection pattern which electrically connects the signal processing circuit part with the connector member, and the connection pattern is, when viewed in the thickness direction of the substrate, passed across the communication antenna so as to be substantially perpendicular to the communication antenna. According to this structure, an effect of the connection pattern on a magnetic field generated by the communication antenna can be reduced, and an effect of the magnetic field generated by the communication antenna on the connection pattern can be reduced.

In at least an embodiment of the present invention, it is preferable that the substrate is, as the connection pattern electrically connecting the signal processing circuit part with the connector member, mounted with a signal pattern through which signal data communicated with the card-shaped medium are transmitted, and the substrate is mounted with a shield pattern formed in mesh shape which covers the signal pattern at least on an inner peripheral side relative to the communication antenna. According to this structure, noise due to a magnetic field generated by the communication antenna can be prevented from being mixed to signal data transmitted through the signal pattern can be prevented by the shield pattern. Specifically, a carrier wave included in the magnetic field generated by the communication antenna and noise caused by the carrier wave can be prevented from being mixed to signal data transmitted through the signal pattern by the shield pattern. Further, according to this structure, since the shield pattern is formed in a mesh shape, an electric resistance of the shield pattern can be increased. Therefore, even when the shield pattern is disposed on an inner peripheral side relative to the communication antenna, strength of an eddy current generated in the shield pattern can be reduced and thereby a loss due to the eddy current is reduced. As a result, even when the shield pattern is disposed on an inner peripheral side relative to the communication antenna, the magnetic field strength generated by the communication antenna can be suppressed from being reduced by the shield pattern.

In at least an embodiment of the present invention, for example, the shield pattern is formed in the mesh shape by forming a plurality of straight-shaped patterns having a straight line shape to intersect each other, and a width of the straight-shaped pattern is substantially equal to a width of the signal pattern.

In at least an embodiment of the present invention, the non-contact type information processing device includes, for example, a SAM socket to which a SAM chip is attached, and the SAM socket is mounted on the substrate on an inner peripheral side relative to the communication antenna formed in the ring shape. In this case, even when the SAM socket is mounted on the substrate, a region for mounting the SAM socket is not required to provide on an outer peripheral side relative to the communication antenna of the substrate. Therefore, even when the SAM socket is mounted on the substrate, the size of the substrate can be reduced.

As described above, according to at least an embodiment of the present invention, the size of the non-contact type information processing device can be relatively reduced and the strength of a magnetic field generated by the communication antenna (for example, communication antenna formed in a ring shape) can be suppressed from being reduced.

DESCRIPTION OF EMBODIMENTS

Embodiments will now be described, by way of example only, with reference to the accompanying drawings which are meant to be exemplary, not limiting, and wherein like elements are numbered alike in several Figures, in which:

An embodiment of the present invention will be described below with reference to the accompanying drawings.

(Structure of Non-Contact Type Information Processing Device)

Figure 1:
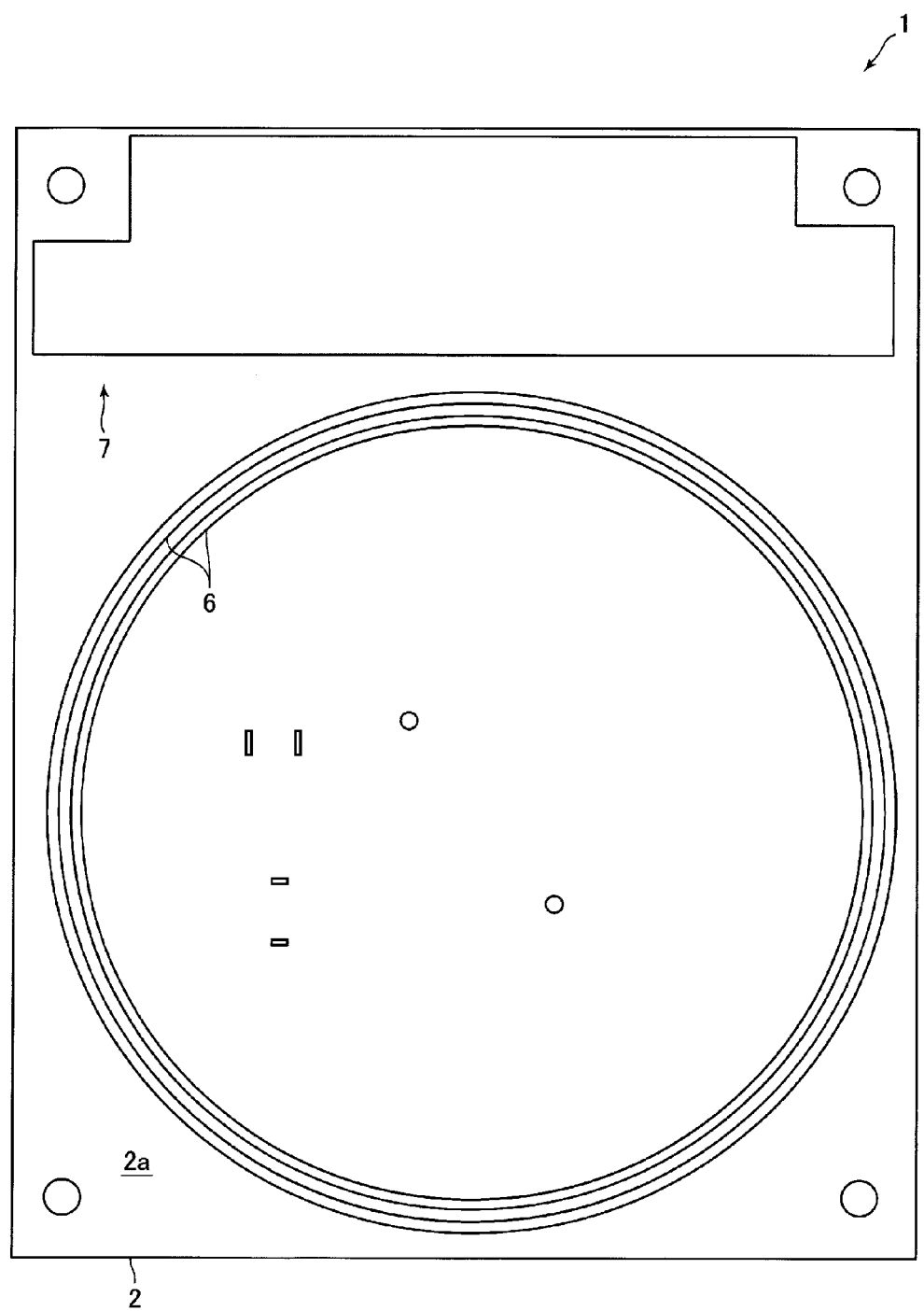
FIG. 1 is a view showing a front side of a non-contact type information processing device in accordance with an embodiment of the present invention.
Figure 2:
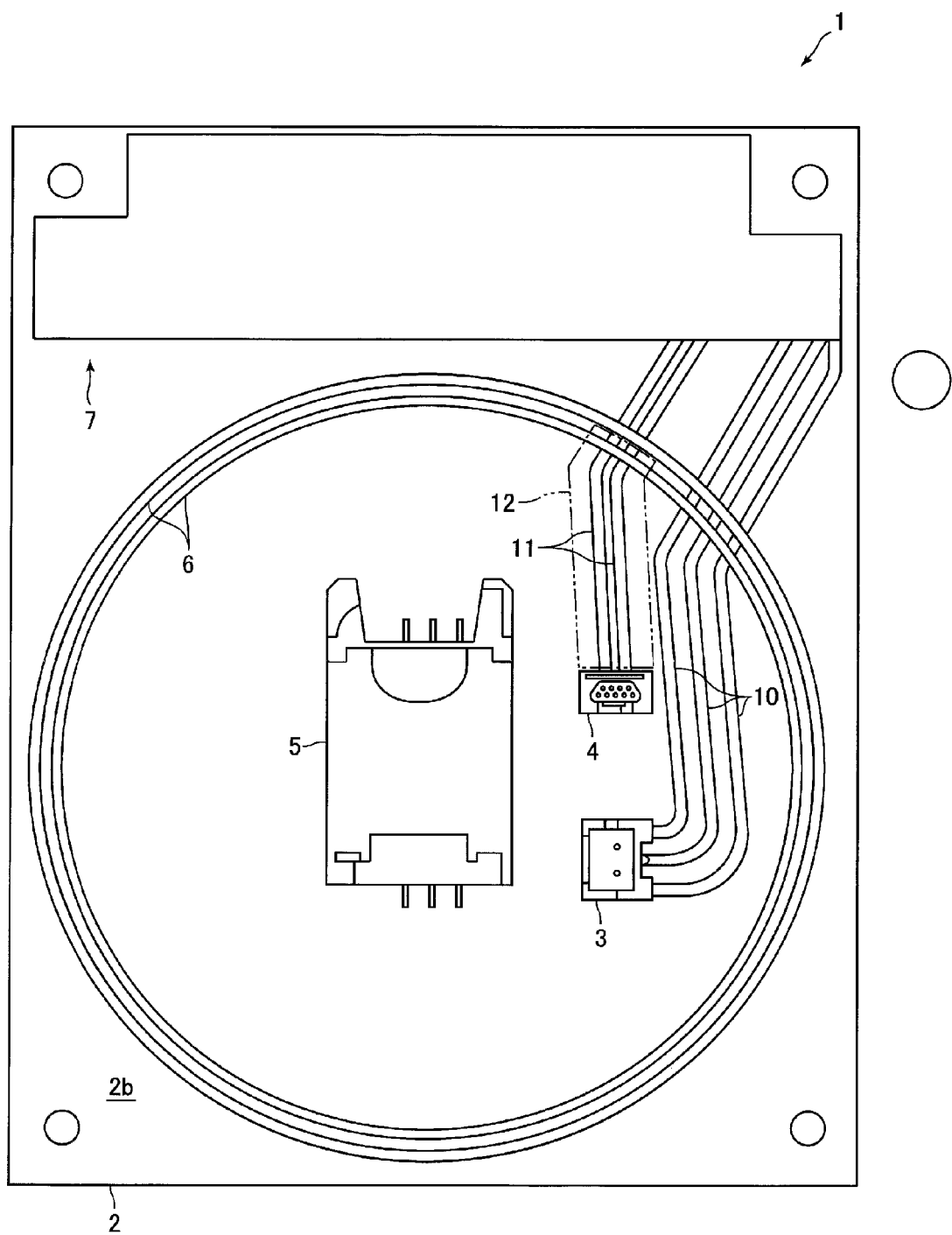
FIG. 2 is a view showing a rear side of the non-contact type information processing device shown in FIG. 1.
Figure 3:
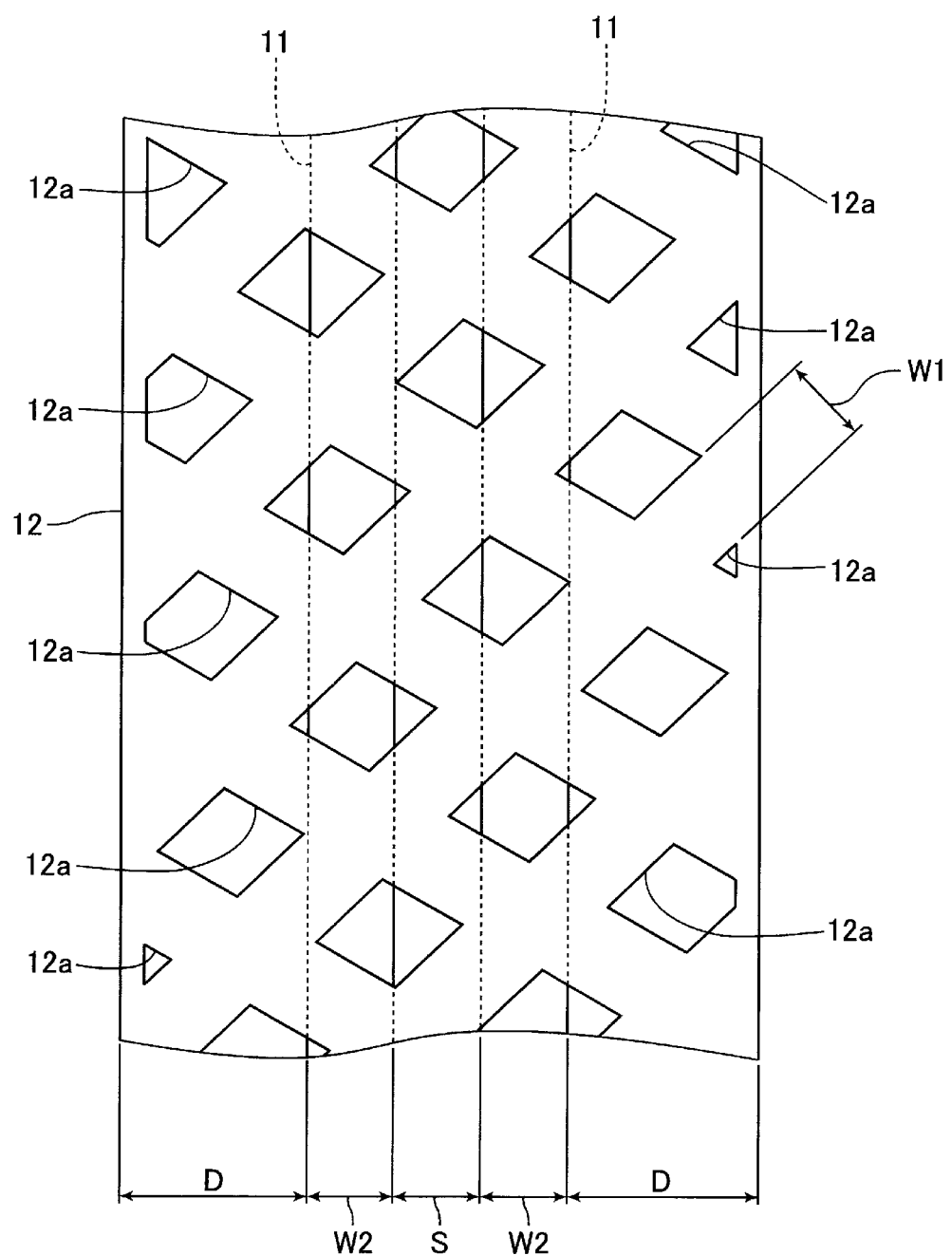
FIG. 3 is an enlarged view for explaining a structure of a shield pattern shown in FIG. 2.

FIG. 1 is a view showing a front side of a non-contact type information processing device 1 in accordance with an embodiment of the present invention. FIG. 2 is a view showing a rear side of the non-contact type information processing device 1 shown in FIG. 1. FIG. 3 is an enlarged view for explaining a structure of a shield pattern 12 shown in FIG. 2.

A non-contact type information processing device 1 in this embodiment is a non-contact type IC card reader for performing communication of information in a non-contact manner with a non-contact type IC card (not shown) which is a card-shaped medium and is, for example, mounted for use on a predetermined host device such as an ATM (Automated Teller Machine). The non-contact type information processing device 1 includes a substrate 2, connector members 3 and 4 for electrically connecting the non-contact type information processing device 1 with the host device, and a SAM socket 5 to which a SAM (Secure Application Module) chip (not shown) is attached. Further, the non-contact type information processing device 1 is mounted on the host device so that a front side face (front face) 2a of the substrate 2 faces an IC card which is to be processed in the host device. The non-contact type information processing device 1 is designed so as to satisfy the standard of ISO/IEC14443.

The substrate 2 is a rigid substrate such as a glass epoxy substrate and is formed in a substantially rectangular flat plate shape. Further, the substrate 2 is a multilayer substrate in which a plurality of conductor layers and insulating layers are alternately laminated. A communication antenna 6 for communicating with a non-contact type IC card and a signal processing circuit part 7 which is electrically connected with the communicating antenna 6 are mounted on the substrate 2.

The communication antenna 6 is formed in a ring shape. Specifically, the communication antenna 6 is formed in a circular ring shape. The signal processing circuit part 7 includes various electronic components (not shown) for processing information which is communicated with an IC card. Specifically, the signal processing circuit part 7 includes electronic components such as an IC chip. Further, the signal processing circuit part 7 is provided with various patterns for connecting between the electronic components with each other and the various patterns are mounted in the substrate 2. The various electronic components which structure the signal processing circuit part 7 are mounted on both faces of the front face 2a and the rear face 2b of the substrate 2. Further, the signal processing circuit part 7 (more specifically, the various electronic components and patterns structuring the signal processing circuit part 7) are mounted on the substrate 2 on an outer peripheral side relative to the communication antenna 6 formed in a circular ring shape. The signal processing circuit part 7 is covered by a shield member not shown. In accordance with an embodiment of the present invention, the signal processing circuit part 7 may be covered by no shield member.

The connector member 3 is a power supply connector for supplying electric power to the non-contact type information processing device 1 and is, for example, a male connector. The connector member 4 is a communication connector for transmitting and receiving signal data between the signal processing circuit part 7 and the host device and is, for example, a USB (Universal Serial Bus) connector. Further, the connector member 4 is, for example, a male connector.

The connector members 3 and 4 are mounted on the rear face 2b of the substrate 2. Further, the connector members 3 and 4 are mounted on the substrate 2 on an inner peripheral side relative to the communication antenna 6 which is formed in a circular ring shape. In this embodiment, as described below, the SAM socket 5 is mounted at a center position on the inner peripheral side relative to the communication antenna 6 and the connector members 3 and 4 are mounted so as to be adjacent to the SAM socket 5. In addition, the connector members 3 and 4 are mounted on the substrate 2 so that inserting directions of female connectors (not shown) as a second connector member, which are inserted and connected with the connector members 3 and 4, are substantially parallel to a thickness direction of the substrate 2 (substantially parallel to a direction perpendicular to the paper face of FIG. 2). Wiring lines drawn out from the female connectors which are inserted and connected with the connector members 3 and 4 are connected with the host device. In this embodiment, the wiring lines are extended in a thickness direction of the substrate 2 and, when viewed in the thickness direction of the substrate 2, the wiring lines do not cross the communication antenna 6.

The substrate 2 is mounted with connection patterns 10 electrically connecting the connector member 3 with the signal processing circuit part 7 and connection patterns 11 electrically connecting the connector member 4 with the signal processing circuit part 7. The connection patterns 10 are power supply patterns for supplying electric power to the signal processing circuit part 7. In this embodiment, three connection patterns 10 are mounted in the substrate 2. The connection patterns 11 are signal patterns through which signal data communicated with an IC card are transmitted. In this embodiment, two connection patterns 11 are mounted in the substrate 2. The connection patterns 10 and 11 are formed in a conductor layer different from the communication antenna 6 and are passed across the communication antenna 6. In this embodiment, when viewed in the thickness direction of the substrate 2, the connection patterns 10 and 11 are passed across the communication antenna 6 so as to be substantially perpendicular to the communication antenna 6. Further, the connector member 4 and the signal processing circuit part 7 are also electrically connected with each other through a power supply pattern and a ground pattern not shown.

An inner peripheral side portion of the connection pattern 11 relative to the communication antenna 6 is covered by a shield pattern 12 in a mesh shape which is mounted in the substrate 2. The shield pattern 12 is formed in a conductor layer which is different from the communication antenna 6 and the connection pattern 11. A plurality of straight-shaped patterns 12a formed in a straight line shape is intersected with each other as shown in FIG. 3 and thereby the shield pattern 12 is formed in a mesh shape. A width "W1" of the straight-shaped pattern 12a is set to be substantially equal to a width "W2" of the connection pattern 11. Further, a distance "S" between two connection patterns 11 is set to be substantially constant and the distance "S" is set to be substantially equal to the width "W2". Further, a distance "D" between an end part of the connection pattern 11 and an end part of the shield pattern 12 in a direction perpendicular to a forming direction of the connection pattern 11 (upper and lower direction in FIG. 3) is set to be about two times of the width "W2". In accordance with and embodiment of the present invention, the distance "D" may be two times or more of the width "W2".

The SAM socket 5 is mounted on the rear face 2b of the substrate 2. Further, the SAM socket 5 is mounted on the substrate 2 on an inner peripheral side relative to the communication antenna 6 which is formed in a circular ring shape. Specifically, the SAM socket 5 is mounted at a center position on the inner peripheral side relative to the communication antenna 6. In addition, the SAM socket 5 is mounted on the substrate 2 so that an inserting direction of a SAM chip inserted into the SAM socket 5 is substantially perpendicular to the thickness direction of the substrate 2. The substrate 2 is mounted with connection patterns (not shown) which electrically connect the SAM socket 5 with the signal processing circuit part 7. The connection patterns are formed in a conductor layer different from the communication antenna 6 and, when viewed in the thickness direction of the substrate 2, the connection patterns are passed across the communication antenna 6 so as to be substantially perpendicular to the communication antenna 6.

In this embodiment, while communication of information is performed between the non-contact type information processing device 1 and an IC card, communication of information is not performed between the non-contact type information processing device 1 and the SAM chip. In other words, while communication of information is performed between the non-contact type information processing device 1 and the SAM chip, communication of information is not performed between the non-contact type information processing device 1 and an IC card.

Principal Effects in this Embodiment

As described above, in this embodiment, the signal processing circuit part 7 is mounted on the substrate 2 on an outer peripheral side relative to the communication antenna 6 which is formed in a circular ring shape and, on the other hand, the connector members 3 and 4 are mounted on the substrate 2 on an inner peripheral side relative to the communication antenna 6. Therefore, in this embodiment, a region for mounting the connector members 3 and 4 is not required to provide on an outer peripheral side of the substrate 2 relative to the communication antenna 6. Accordingly, in this embodiment, the size of the substrate 2 can be relatively reduced and, as a result, the size of the non-contact type information processing device 1 can be relatively reduced.

Further, in this embodiment, since the SAM socket 5 is mounted on the substrate 2 on an inner peripheral side relative to the communication antenna 6, even when the SAM socket 5 is mounted on the substrate 2, a region for mounting the SAM socket 5 is not required to provide on an outer peripheral side relative to the communication antenna 6 of the substrate 2. Therefore, in this embodiment, even when the SAM socket 5 is mounted on the substrate 2, the size of the substrate 2 can be reduced.

In this embodiment, the signal processing circuit part 7 is mounted on the substrate 2 on an outer peripheral side relative to the communication antenna 6 and the shield member which is disposed on an inner peripheral side relative to the communication antenna 6 is only the shield pattern 12 which covers the connection patterns 11. Therefore, in this embodiment, a magnetic field strength generated by the communication antenna 6 can be suppressed from being reduced by the shield member. Especially, in this embodiment, since the shield pattern 12 is formed in a mesh shape, an electric resistance of the shield pattern 12 can be increased. Therefore, in this embodiment, even when the shield pattern 12 is disposed on an inner peripheral side relative to the communication antenna 6, the strength of an eddy current generated in the shield pattern 12 can be reduced and thereby a loss due to the eddy current is reduced. As a result, in this embodiment, even when the shield pattern 12 is disposed on an inner peripheral side relative to the communication antenna 6, the magnetic field strength generated by the communication antenna 6 can be suppressed from being reduced by the shield pattern 12.

In this embodiment, the connector members 3 and 4 are mounted on the substrate 2 so that the inserting directions of the female connectors, which are inserted and connected with the connector members 3 and 4, are substantially parallel to the thickness direction of the substrate 2 and, when viewed in the thickness direction of the substrate 2, the wiring lines which are drawn out from the female connectors do not cross the communication antenna 6. Therefore, in this embodiment, an effect of the wiring lines drawn out from the female connectors on the magnetic field generated by the communication antenna 6 can be reduced. Further, in this embodiment, an effect of the magnetic field generated by the communication antenna 6 on the wiring lines drawn out from the female connectors can be reduced.

In this embodiment, when viewed in the thickness direction of the substrate 2, the connection patterns 10 and 11 are passed across the communication antenna 6 so as to be substantially perpendicular to the communication antenna 6. Therefore, in this embodiment, an effect of the connection patterns 10 and 11 on a magnetic field generated by the communication antenna 6 can be reduced, and an effect of the magnetic field generated by the communication antenna 6 on the connection patterns 10 and 11 can be reduced.

In this embodiment, the connection patterns 11 are covered by the shield pattern 12. Therefore, in this embodiment, noise due to the magnetic field generated by the communication antenna 6, a carrier wave included in the magnetic field, and noise caused by the carrier wave can be prevented from being mixed to signal data transmitted through the connection patterns 11 by the shield pattern 12. Especially, in this embodiment, the distance "D" between an end part of the connection pattern 11 and an end part of the shield pattern 12 is set to be about two times of the width "W2" of the connection pattern 11. Therefore, noise due to the magnetic field generated by the communication antenna 6, a carrier wave included in the magnetic field, and noise caused by the carrier wave can be prevented from reaching to the connection patterns 11 from the end part of the shield pattern 12 and being mixed to signal data transmitted through the connection patterns 11 by the shield pattern 12.

Other Embodiments

Although the present invention has been shown and described with reference to a specific embodiment, various changes and modifications will be apparent to those skilled in the art from the teachings herein.

In the embodiment described above, the communication antenna 6 is formed in a circular ring shape. However, the present invention is not limited to this embodiment. For example, the communication antenna 6 may be formed in a multi-angular ring shape such as a rectangular ring shape or a hexagonal ring shape, and may be formed in an elliptical ring shape. Further, in the embodiment described above, the connector members 3 and 4 are mounted on the substrate 2 on an inner peripheral side relative to the communication antenna 6. However, it may be structured that only one of the connector member 3 and the connector member 4 is mounted on the substrate 2 on an inner peripheral side relative to the communication antenna 6 and the other of the connector member 3 and the connector member 4 may be mounted on the substrate 2 on an outer peripheral side relative to the communication antenna 6. In a case that the connector member 4 is mounted on the substrate 2 on an outer peripheral side relative to the communication antenna 6, the shield pattern 12 is not formed on an inner peripheral side relative to the communication antenna 6. Therefore, in this case, the magnetic field strength generated by the communication antenna 6 can be effectively suppressed from being reduced.

In the embodiment described above, when viewed in the thickness direction of the substrate 2, the connection patterns 10 and 11 are passed across the communication antenna 6 so as to be substantially perpendicular to the communication antenna 6. However, the present invention is not limited to this embodiment. For example, when viewed in the thickness direction of the substrate 2, the connection patterns 10 and 11 may be passed across the communication antenna 6 so as to be inclined with respect to a direction substantially perpendicular to the communication antenna 6. Further, in the embodiment described above, the SAM socket 5 is mounted on the substrate 2. However, no SAM socket 5 may be mounted on the substrate 2. In this case, it is preferable that the connector members 3 and 4 are mounted at a center position on an inner peripheral side relative to the communication antenna 6.

In the embodiment described above, the width "W1" of the straight-shaped pattern 12a of the shield pattern 12 is set to be substantially equal to the width "W2" of the connection pattern 11. However, the width "W1" may be set wider than the width "W2" or may be narrower than the width "W2". Further, in the embodiment described above, the shield pattern 12 is formed in a mesh shape having spaces, but the shield pattern 12 may be formed in a strip shape having no space. Further, in the embodiment described above, a portion of the connection pattern 11 on an inner peripheral side relative to the communication antenna 6 is covered by the shield pattern 12, but the entire connection pattern 11 may be covered by the shield pattern 12.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A non-contact type information processing device which performs communication of information with a card-shaped medium in a non-contact manner, the non-contact type information processing device comprising:
   a flat plate-shaped substrate on which a communication antenna formed in a ring shape and a signal processing circuit part electrically connected with the communication antenna are mounted; and
   a connector member structured to electrically connect a host device on which the non-contact type information processing device is mounted with the non-contact type information processing device;
   wherein the signal processing circuit part is, when viewed in a thickness direction of the substrate, mounted on the substrate on an outer side with respect to an outermost ring shape of the communication antenna formed in the ring shape; and
   wherein the connector member is, when viewed in the thickness direction of the substrate, mounted on the substrate on an inner side with respect to an innermost ring shape of the communication antenna formed in the ring shape so that an inserting and attaching direction of a second connector member which is inserted and connected with the connector member is substantially parallel to a thickness direction of the substrate.

2. The non-contact type information processing device according to claim 1, wherein
   the substrate is mounted with a connection pattern which electrically connects the signal processing circuit part with the connector member, and
   the connection pattern is, when viewed in the thickness direction of the substrate, passed across the communication antenna from an outer side with respect to the outermost ring shape of the communication antenna to an inner side with respect to the innermost ring shape of the communication antenna so as to be substantially perpendicular to the communication antenna.

3. The non-contact type information processing device according to claim 2, wherein
   the substrate is, as the connection pattern electrically connecting the signal processing circuit part with the connecter member, mounted with a signal pattern through which signal data communicated with the card-shaped medium are transmitted, and
   the substrate is mounted with a shield pattern formed in mesh shape which covers the signal pattern at least on an inner side with respect to the innermost ring shape of the communication antenna.

4. The non-contact type information processing device according to claim 3, wherein
   the shield pattern is formed in the mesh shape by forming a plurality of straight-shaped patterns having a straight line shape to intersect each other, and
   a width of the straight-shaped patter is substantially equal to a width of the signal pattern.

5. The non-contact type information processing device according to claim 2, wherein
   the connector member comprises a power supply connector for supplying electric power to the non-contact type information processing device and a communication connector for transmitting and receiving signal data between the signal processing circuit part and the host device, and
   the connection pattern comprises a power supply pattern for supplying electric power to the signal processing circuit part and a signal pattern through which signal data communicated with the card-shaped medium are transmitted.

6. The non-contact type information processing device according to claim 1, wherein
   the substrate is, as the connection pattern electrically connecting the signal processing circuit part with the connector member, mounted with a signal pattern through which signal data communicated with the card-shaped medium are transmitted, and
   the substrate is mounted with a shield pattern formed in mesh shape which covers the signal pattern at least on an inner side with respect to the innermost ring shape of the communication antenna.

7. The non-contact type information processing device according to claim 6, wherein
   the shield pattern is formed in the mesh shape by forming a plurality of straight-shaped patterns having a straight line shape to intersect each other, and
   a width of the straight-shaped pattern is substantially equal to a width of the signal pattern.

8. The non-contact type information processing device according to claim 1, further comprising a SAM socket to which a SAM chip is attached,
   wherein the SAM socket is mounted on the substrate on an inner side with respect to the innermost ring shape of the communication antenna formed in the ring shape.

* * * * *